US012791444B2

(12) United States Patent
Liu et al.

(10) Patent No.: US 12,791,444 B2
(45) Date of Patent: Nov. 10, 2026

(54) TIRE TREAD EXAMINING DEVICE

(71) Applicant: SHENZHEN SMARTSAFE TECH CO., LTD., Shenzhen (CN)

(72) Inventors: Jun Liu, Shenzhen (CN); Wei Zhan, Shenzhen (CN); Keran Liu, Shenzhen (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 0 days.

(21) Appl. No.: 18/714,408

(22) PCT Filed: Dec. 14, 2023

(86) PCT No.: PCT/CN2023/138742
§ 371 (c)(1),
(2) Date: May 29, 2024

(87) PCT Pub. No.: WO2024/239615
PCT Pub. Date: Nov. 28, 2024

(65) Prior Publication Data
US 2026/0168890 A1 Jun. 18, 2026

(30) Foreign Application Priority Data
May 24, 2023 (CN) ........................ 202310594175.9

(51) Int. Cl.
*G01M 17/02* (2006.01)

(52) U.S. Cl.
CPC ................................ *G01M 17/027* (2013.01)

(58) Field of Classification Search
CPC ............ B60C 2011/0033; B60C 11/24; B60C 11/243; B60C 11/246; B60C 11/03;
(Continued)

(56) References Cited

U.S. PATENT DOCUMENTS

| | | | |
|---|---|---|---|
| D596,202 | S | 7/2009 | Van |
| 9,885,625 | B2 | 2/2018 | Wu |
| 2022/0164944 | A1 | 5/2022 | Eade et al. |

FOREIGN PATENT DOCUMENTS

| | | |
|---|---|---|
| CN | 1158159 A | 8/1997 |
| CN | 110914636 A | 3/2020 |

(Continued)

OTHER PUBLICATIONS

CNIPA First Office Action corresponding to CN Application No. 202310594175.9; Issue date, Nov. 29, 2025, 14 pages.

(Continued)

*Primary Examiner* — John E Breene
*Assistant Examiner* — Truong D Phan
(74) *Attorney, Agent, or Firm* — CANTOR COLBURN LLP

(57) ABSTRACT

This application provides a tire tread examining device, including: a case component, which includes a detection case and a handle case, the handle case being able to drive the detection case to move, and the detection case and the handle case being spaced apart; a positioning component, including a tire abutting plate disposed on an end of the detection case and perpendicular to a lengthwise direction of the detection case; a detection assembly including a detection element located on an end of the detection case away from the tire abutting plate.

16 Claims, 2 Drawing Sheets

(58) Field of Classification Search
CPC ............ B60C 25/0548; B60C 25/0551; B60C 25/0554; B60C 25/0572; B60C 25/0563; B60C 25/0521
USPC .............................................. 73/146, 8, 45.6
See application file for complete search history.

(56) References Cited

FOREIGN PATENT DOCUMENTS

| | | | | |
|---|---|---|---|---|
| CN | 110954012 A | | 4/2020 | |
| CN | 112033698 A | * | 12/2020 | ............ G01M 13/02 |
| CN | 212721325 U | | 3/2021 | |
| CN | 214251558 U | | 9/2021 | |
| CN | 215261653 U | | 12/2021 | |
| CN | 217687893 U | | 10/2022 | |
| CN | 116519333 A | | 8/2023 | |
| CN | 117405036 A | | 1/2024 | |
| CN | 220339670 U | | 1/2024 | |
| DE | 102015001018 A1 | | 8/2015 | |
| KR | 20080077812 A | | 8/2008 | |
| KR | 20140001244 U | | 3/2014 | |

OTHER PUBLICATIONS

JPO Notification of Refusal corresponding to JP Application No. 2023-503479; Issue date, Feb. 28, 2025, 18 pages.
KR Notification of Refusal corresponding to KR Application No. DM/233595; Issue date, Oct. 17, 2025, 5 pages.
U.S. Notice of Allowance corresponding to U.S. Appl. No. 29/918,074; Issue date; Apr. 3, 2025, 8 pages.
International Search Report for International Application No. PCT/CN2023/138742; Mailing Date, Mar. 18, 2024.
CNIPA Second Office Action corresponding to CN Application No. 202310594175.9; Issue date, Mar. 5, 2026, 10 pages.

* cited by examiner

TIRE TREAD EXAMINING DEVICE

CROSS-REFERENCE TO RELATED APPLICATIONS

The present application is a U.S. national phase of International Patent Application No. PCT/CN2023/138742 with an international filing date of Dec. 14, 2023, designating the U.S., now pending, and further claims the priority of Chinese patent application No. 202310594175.9 filed on May 24, 2023 with the Chinese Patent Office, and titled "Tire Tread Examining Device", the entire contents of which are incorporated herein by reference.

TECHNICAL FIELD

The present application relates to the technical field of tire tread examining equipment, and in particular, to a tire tread examining device.

BACKGROUND

The inspection of car tire treads is of great significance to driving safety of cars. The depth, width and shape of the tire treads affect the friction of the tire surface. Therefore, regular inspection of tire treads is required.

The current tire tread examining device requires the inspector to squat down to the tire level, holding the tire tread examining device into the gap between the bumper and the ground. During this process, the inspectors keep their hands in a position where it is not ergonomic and difficult to operate. Therefore, full contact between the tire abutting plate of the tire tread examining device and the tire tread examining device cannot be ensured, and the tire tread examining device tends to tilt relative to the tire surface, causing low examination accuracy.

SUMMARY

An objective of this application is to provide a tire tread examining device to at least solve the problem that it is difficult to ensure that the tire abutting plate and the tire tread examining device are fully in contact due to the design of the existing tire tread examining devices, thus the tire tread examining device tends to tilt relative to the tire surface, causing low examination accuracy.

In order to achieve the above objective, a technical proposal of the present application is as follows.

In a first aspect, a tire tread examining device is provided, which includes:

- a case assembly including a detection case and a handle case, the handle case can drive the detection case to move, and the detection case and the handle case are spaced apart;
- a positioning assembly, including a tire abutting plate located on an end portion of the detection case and perpendicular to a lengthwise direction of the detection case; and
- a detection assembly, including a detection element located on an end portion of the detection case away from the tire abutting plate.

The following advantageous effects can be achieved by adopting the above technical proposal.

Firstly, the detection case and the handle case are arranged at intervals, so that when the inspector holds the handle case and extends the detection case into the gap between the car bumper and the ground, the handle case can remain outside the gap, or the handle case does not have to extend into the gap too much. This prevents the inspector from having difficulty in applying force to the detection case, causing the tire abutting plate on the detection case to fail to be accurately abutted against the tire tread surface or tilt.

Secondly, since the tire abutting plate is perpendicular to the lengthwise direction of the detection case, when the inspector abuts the tire abutting plate on the tire, the lengthwise direction of the detection case is perpendicular to the tire surface so that the tire tread examining device has a high detection accuracy.

Lastly, the detection element and the tire abutting plate are respectively located at the opposite end portions of the detection case, so that when the tire abutting plate is in contact with the tread surface of the tire, the detection element is separated from the tread surface of the tire by a certain distance, so that the detection element is positioned at a suitable detection distance, thereby improving the detection accuracy.

In one embodiment, the lengthwise direction of the detection case is parallel to a lengthwise direction of the handle case.

By adopting the above technical proposal, it is convenient for the inspector to adjust the relative position of the tire tread examining device relative to the tread surface of the tire to be examined and improve the detection accuracy.

In one embodiment, the case assembly further includes a rotation shaft connecting the handle case and the detection case. The rotation shaft is perpendicular to the lengthwise direction of the detection case. The handle case can rotate around the rotation shaft.

By adopting the above technical proposal, the flexibility between the handle case and the detection case is improved, reducing the risk of affecting the tire tread examining device when the inspection space is limited.

In one embodiment, the tire abutting plate includes at least two abutting portions and a concave portion located between two adjacent abutting portions. The abutting portions have a flat surface for abutting against the tire tread surface, and the concave portion is used for avoiding uneven parts on the tire tread surface. The concave portion is inwardly recessed toward an interior of the tire abutting plate relative to the abutting portions.

By adopting the above technical proposal, it is ensured that the tire abutting plate is in close contact with the tire tread surface, reducing the possibility of tilting of the tire tread examining device, thereby reducing inspection errors.

In one embodiment, the tire abutting plate further includes a magnetic portion, the magnetic portion is disposed on the abutting portions and cooperates with a calibration device.

By adopting the above technical proposal, a simple fixed connection structure between the tire abutting plate and the calibration device can be achieved which is easy to operate.

In one embodiment, the positioning assembly further includes a pushing rod provided on the detection case and extending away from the detection case along the lengthwise direction of the detection case, and the tire abutting plate is arranged on an end of the pushing rod away from the detection case.

By adopting the above technical proposal, it is easy to observe the tire abutting plate, and the detection efficiency can be improved.

In one embodiment, the positioning assembly further includes a pushing rod connector that detachably connects the pushing rod and the detection case.

By adopting the above technical proposal, it is easy to replace the pushing rod and the tire abutting plate, and the adaptability of the tire tread examining device is improved by changing pushing rods of different lengths and tire abutting plates of different specifications.

In one embodiment, the detection element includes a laser component and a camera component. The laser component is configured for emitting a detection laser to form a detection light strip on the tire tread surface. The camera component is configured for capturing the light strip formed on the tire tread surface.

By adopting the above technical proposal, the detection accuracy of the detection element is high.

In one embodiment, the detection assembly further includes a control board electrically connected to the laser component and the camera component. The control board is disposed inside the handle case, and the control board is configured for controlling the laser component and analyzing the detection light strip captured by the camera component.

By adopting the above technical proposal, the volume of the detection case is reduced, making it easier for the detection case to extend into the gap between the vehicle bumper and the tire.

In one embodiment, the detection assembly further includes a display panel and a battery that are electrically connected to the control board. The display panel is arranged on a surface of the handle case, and the battery is accommodated inside the handle case.

By adopting the above technical proposal, the applicability of the tire tread examining device is improved.

BRIEF DESCRIPTION OF THE DRAWINGS

In order to more clearly illustrate the technical proposals in the embodiments of the present application, the drawings required to be used in the embodiments will be briefly introduced below. Apparently, the drawings in the following description are only some embodiments of the present application. Those of ordinary skill in the art can also obtain other drawings based on these drawings without exerting creative efforts.

Figure 1:
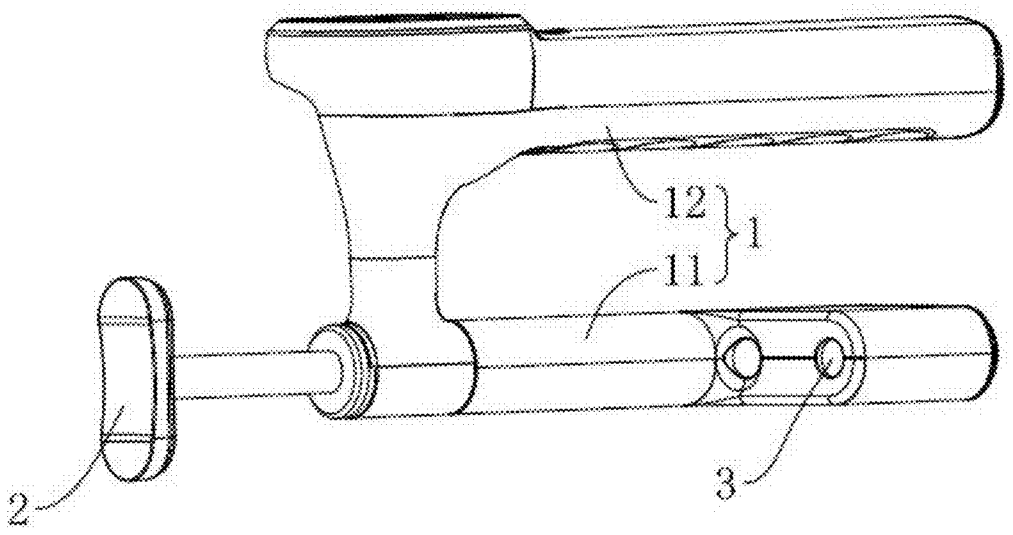
FIG. 1 is a perspective view of a tire tread examining device provided by an embodiment of the present application when viewed from an angle.

Reference signs are as follows:

1 case assembly; 2 positioning assembly; 3 detection assembly; 40 calibration device;

11 detection case; 12 handle case; 13 rotation shaft; 21 tire abutting plate; 22 pushing rod; 23 pushing rod connector; 31 detection element; 32 control board; 33 display panel; 34 battery;

211 abutting portion; 212 concave portion; 213 magnetic portion; 311 laser component; 312 camera component; 313 laser component lens; and 314 camera component lens.

DETAILED DESCRIPTION OF THE EMBODIMENTS

In order to make the above objects, features and advantages of the present application clearer and easier to understand, the present application will be described in detail below with reference to the accompanying drawings and embodiments. It should be understood that the embodiments described herein are for illustrative purposes only and should not be construed as limiting the present application.

It should be noted that when an element is referred to as being "fixed to" or "disposed on" another element, it can be directly on the other element or indirectly on the other element. When an element is referred to as being "connected to" another element, it may be directly connected or indirectly connected to the other element.

It should be understood that terms "lengthwise", "widthwise", "front", "rear", "left", "right", "vertical", "horizontal", "top", "bottom", "inside", "outside", etc. indicating orientation or positional relationship are based on the orientation or positional relationship shown in the drawings, and are merely for the convenience of describing the present application and simplifying the description, rather than indicating or implying that the device or element referred to must have a specific orientation, be constructed and operate in a specific orientation, and therefore cannot be construed as limiting the present application.

In addition, terms "first" and "second are used for descriptive purposes only and cannot be understood as indicating or implying the relative importance or implicitly indicating the quantity of the indicated features. In the description of this application, the term "a plurality of" means two or more, unless otherwise expressly and specifically defined. Embodiments of the present application will be described in detail below with reference to the accompanying drawings.

Figure 2:
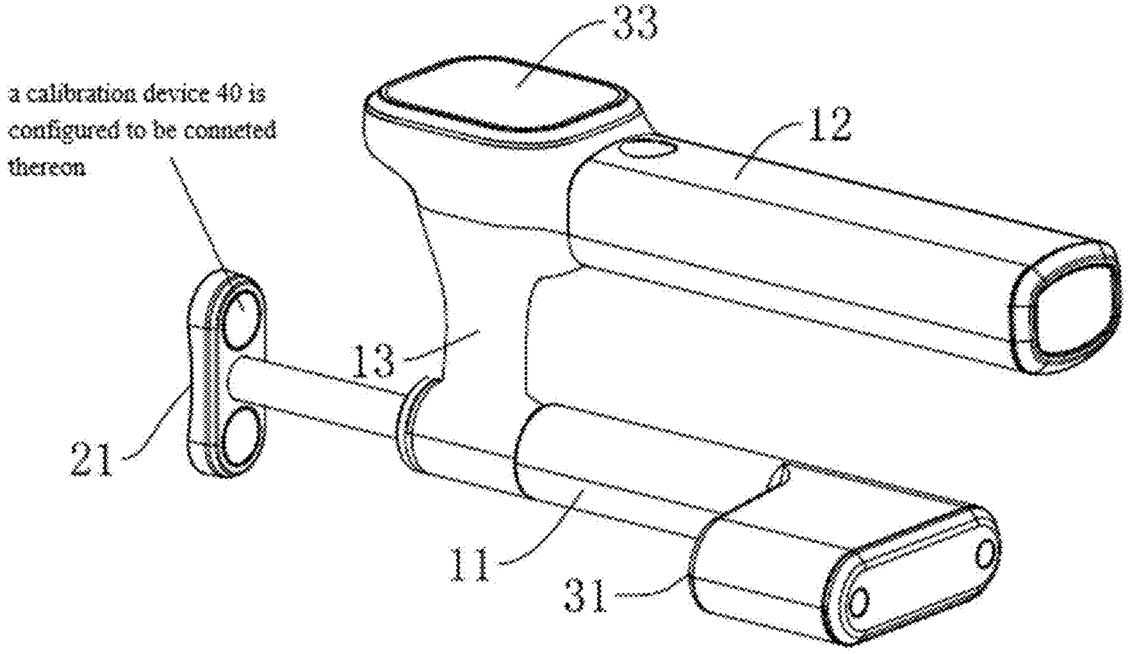
FIG. 2 is a perspective view of the tire tread examining device provided by the embodiment of the present application when viewed from another angle.

As shown in FIGS. 1 and 2, an embodiment of the present application provides a tire tread examining device, which is used to detect the depth, width, and shape of tire treads, thereby analyzing information on the tire tread surface, such as the friction between the tire tread surface and the ground during contact. In this embodiment, the tire tread examining device is held by an inspector to perform inspection operations. Specifically, the inspector extends the tire tread examining device into the gap between the car bumper and the ground, and then abuts the tire tread examining device against the surface of the tire. Here, the surface of the tire provided with tread patterns is referred to as the tire tread surface in this embodiment. Then the tire tread examining device is activated for inspection. The tire tread examining device in this embodiment has the advantages of good inspection operability, not prone to tilting, and having high detection accuracy, which will be explained through specific embodiments below.

The tire tread examining device includes a case assembly 1, a positioning assembly 2, and a detection assembly 3.

The case assembly 1 includes a detection case 11 and a handle case 12, and the handle case 12 can drive the detection case 11 to move. The detection case 11 and the handle case 12 are spaced apart. When the inspector operates the tire tread examining device, the detection case 11 and the handle case 12 are spaced apart along an axial direction of the tire tread surface, where the detection case 11 is located on an inner side of the tire for detecting the tire tread surface, and the handle case 12 is located on an outer side of the tire or separated from the tire for the inspector to hold. Here, the case assembly 1 is used to fix the positioning assembly 2 and the detection assembly 3. The case assembly 1 includes a detection case 11 and a handle case 12, the detection case 11 is used for fixing a tire abutting plate 21 and a detection element 31, and the handle case 12 is for the inspector to grasp. It should be noted that the detection case 11 and the handle case 12 are spaced apart, so that the detection case 11 is at a distance from the inspector when the inspector holds the handle case 12, such that the inspector can extend the positioning assembly 2 and the detection assembly 3 into the gap between the car bumper and the ground, and the inspector's hand can remain outside the gap, so as to avoid the inspector's hand extending too much thus causing the inspector to be unable to press the positioning assembly 2 tightly against the tire tread surface, or the inspector's hand extending too much and causing tilting of the overall tire tread examining device.

The positioning assembly 2 includes a tire abutting plate 21 located on an end portion of the detection case 11 and perpendicular to a lengthwise direction of the detection case 11. Here, the positioning assembly 2 is used for calibrating the position and angle of the tire tread examining device relative to the tire tread surface. Specifically, the positioning assembly 2 includes a tire abutting plate 21 for abutting against the tire tread surface. By adjusting the relative position of the tire abutting plate 21 and the tire tread surface, the position calibration of the tire tread examining device is achieved, thereby ensuring the detection accuracy of the tire tread examining device. It should be noted that the surface of the tire abutting plate 21 is perpendicular to the lengthwise direction of the detection case 11. When the surface of the tire abutting plate 21 is brought into contact with the surface of the tire, the lengthwise direction of the detection case 11 is perpendicular to the surface of the tire. At this time, the tire tread examining device can perform tread inspection with high accuracy.

The detection assembly 3 includes a detection element 31 disposed on an end portion of the detection case 11 away from the tire abutting plate 21. Here, the detection assembly 3 is used for detecting the patterns on the tire tread surface, and the detection method includes but is not limited to image recognition detection. In this embodiment, the detection element 31 is a laser component and a camera component, the laser component forms a detection light strip on the tire tread surface, and the camera component captures an image of the light strip and transmits it to a control board for analysis, thereby obtaining information of the tire tread.

The operation steps of the tire tread examining device provided in this embodiment are as follows.

First, the handle case 12 is held by the inspector, and the detection case 11 is pointed toward the tire to be inspected; second, the inspector extends the detection case 11 into the gap between the car bumper and the ground; third, the tire abutting plate 21 on the detection case 11 is aligned with the tire tread surface and is pressed against the tire tread surface. Since the tire abutting plate 21 is perpendicular to the lengthwise direction of the detection case 11, the lengthwise direction of the detection case 11 now is perpendicular to the tire tread surface, so that the detection element 31 on the detection case 11 is in a suitable detection position.

The following advantageous effects can be achieved by adopting the above technical proposals.

First, the detection case 11 and the handle case 12 are spaced apart in a direction parallel to the tire tread surface, so that when the inspector holds the handle case 12 and extends the detection case 11 into the gap between the car bumper and the ground, the handle case 12 can remain outside the gap, or the handle case 12 is not required to extend too much into the gap so as to avoid the inspector being unable to exert force on the detection case 11, causing the tire abutting plate 21 to be unable to precisely abut against the detection case 11 or tilting of the tire tread surface.

Secondly, since the tire abutting plate 21 is perpendicular to the lengthwise direction of the detection case 11, when the inspector presses the tire abutting plate 21 against the tire tread surface, the lengthwise direction of the detection case 11 is perpendicular to the tire tread surface. Therefore, the tire tread examining device has a high detection accuracy.

Finally, the detection element 31 and the tire abutting plate 21 are respectively located on the opposite end portions of the detection case 11, so that when the tire abutting plate 21 is pressed against the tire tread surface, the detection element 31 is at a certain distance from the tire tread surface, so that the detection element 31 is at a suitable detection distance, thereby improving the detection accuracy.

In one embodiment, the lengthwise direction of the detection case 11 is parallel to the lengthwise direction of the handle case 12.

Here, in this embodiment, the detection case 11 and the handle case 12 are parallel to and spaced apart from each other. That is, when the inspector holds the handle case 12 and adjusts the handle case 12 to be approximately perpendicular to the tire tread surface, the detection case 11 is thus approximately perpendicular to the tire tread surface, so that the tire abutting plate 21 can be adjusted to be in abutment with the tire tread surface more quickly, thereby driving the detection case 11 to be perpendicular to the tire tread surface, and finally the detection element 31 is in a suitable position for detection.

In addition, the lengthwise direction of the handle case 12 is parallel to the lengthwise direction of the detection case 11, such that, when the inspector holds the handle case 12 and applies a force parallel to the lengthwise direction of the handle case 12 on the handle case 12, the force is transmitted from the handle case 12 to the detection case 11 and then to the tire abutting plate 21. Since the force is also parallel to the detection case 11, the tire abutting plate 21 receives a force parallel to the detection case 11. Such design facilitates the inspector to determine the direction of the applied force, reduces the possibility of tilting of the tire tread examining device, and improves the accuracy of inspection.

By adopting the above technical proposal, it is convenient for the inspector to adjust the relative position of the tire tread examining device relative to the tread surface of the tire to be inspected and improve the accuracy of inspection.

In one embodiment, the case assembly 1 also includes a rotation shaft 13 connecting the handle case 12 and the detection case 11. The rotation shaft 13 is perpendicular to the lengthwise direction of the detection case 11, and the handle case 12 can rotate around the rotation shaft 13.

Here, preferably, the handle case 12 is in a damped connection with the rotation shaft 13, that is, the handle case 12 can stop at a target angle relative to the detection case 11, so that when the inspection space is limited, the relative angle between the handle case 12 and the detection case 11 can be adjusted to allow the inspector's hand to grasp the handle case 12 more easily, and the position and direction of applied force can be adjusted, further reducing the risk of tilting of the tire tread examining device.

By adopting the above technical proposal, the flexibility of adjustment between the handle case 12 and the detection case 11 is improved, and the possibility of affecting the tire tread examining device can be reduced when the inspection space is limited.

Figure 3:
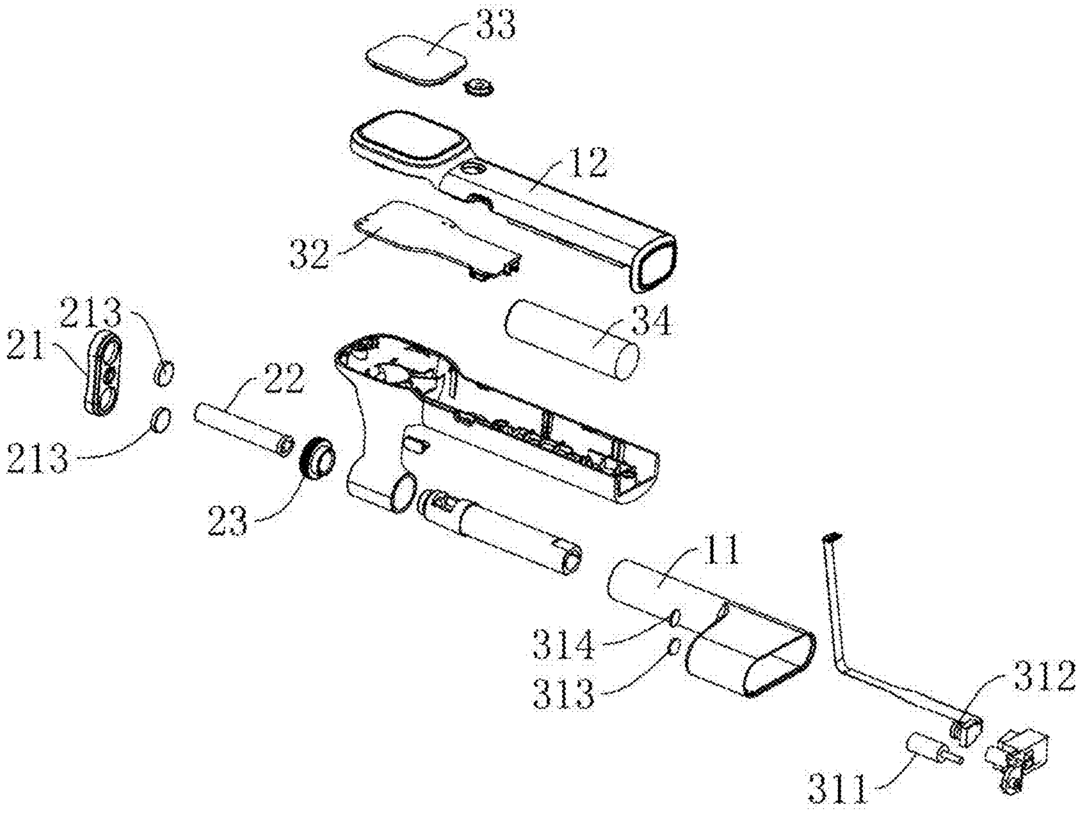
FIG. 3 is an exploded view of the tire tread examining device provided by the embodiment of the present application.
Figure 4:
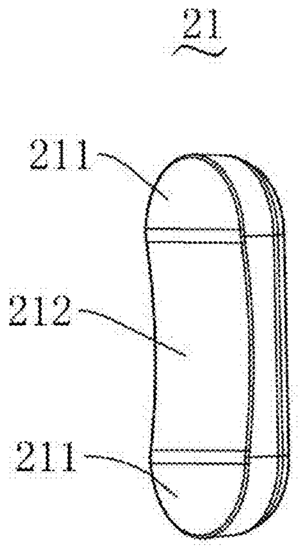
FIG. 4 is a perspective view of the tire abutting plate provided by the embodiment of the present application.

Referring to FIGS. 3 and 4. In one embodiment, the tire abutting plate 21 includes at least two abutting portions 211 and a concave portion 212 located between two adjacent abutting portions 211. The abutting portions 211 are flat structures for abutting against the tire tread surface, and the surface of the abutting portions 211 abutting the tire tread surface is flat. The concave portion 212 is used for avoiding the uneven structure on the tire tread surface. The concave portion 212 is inwardly recessed toward the interior of the tire abutting plate 21 relative to the abutting portions 211.

Here, the design of the tire abutting plate 21 can reduce the contact area with the tire tread surface and reduce the influence of the uneven parts of the tire tread surface on the tire abutting plate 21. Specifically, the tire abutting plate 21 includes abutting portions 211 and a concave portion 212. The abutting portions 211 are used for abutting against the flat parts of the tire tread surface, and the concave portion 212 is used for avoiding the uneven parts of the tire. By providing at least two abutting portions 211 respectively abutted against different flat parts of the tire tread surface and the concave portion 212 located between the two abutting portions 211 for avoiding the uneven parts of the tire, it is ensured that the tire abutting plate 21 is in close contact with the tire tread surface and the possibility of tilting of the tire tread examining device is reduced.

By adopting the above technical proposal, it is ensured that the tire abutting plate 21 is in close contact with the tire tread surface, thereby reducing the possibility of tilting of the tire tread examining device and reducing detection errors.

In one embodiment, the tire abutting plate 21 further includes a magnetic portion 213, which is provided on the abutting portion 211 and used for cooperating with the calibration device.

It can be understood that the tire tread examining device needs to be calibrated through a calibration device before detection. The tire abutting plate 21 is provided with a magnetic portion 213 that cooperates with the calibration device. That is, the magnetic portion 213 can fix the tire abutting plate 21 on the calibration device, making it convenient to perform calibration operations.

Specifically, the tire tread examining device of this embodiment is provided with a calibration device 40 such as a standard calibration block (not shown). The standard calibration block can be made of iron or stainless steel, and the magnetic portion 213 on the tire abutting plate 21 is used to attach the tire tread examining device on the standard calibration block. A groove depth of the standard calibration block is measured as a standard depth for detection. Then, after the standard calibration block is removed, the actual depth of the tire tread is measured. The calibration is completed by analyzing the difference between the actual depth and the standard depth.

By adopting the above technical proposal, a simple fixed connection between the tire abutting plate 21 and the calibration device is achieved, which is easy to operate.

In one embodiment, the positioning assembly 2 further includes a pushing rod 22, which is provided on the detection case 11 and extends away from the detection case 11 along the lengthwise direction of the detection case 11, and the tire abutting plate 21 is disposed on an end portion of the pushing rod away from the detection case 11.

Here, the pushing rod 22 is used to increase the extension length of the tire abutting plate 21 relative to the detection case 11. The pushing rod 22 can also prevent the tire abutting plate 21 from being blocked by a large detection case 11, so that the inspector can easily observe if the tire abutting plate 21 is abutted with the tire tread surface, thereby improving the detection efficiency.

By adopting the above technical proposal, it is easy to observe the tire abutting plate 21, and the detection efficiency is improved.

In one embodiment, the positioning assembly 2 further includes a pushing rod connector 23 that detachably connects the pushing rod 22 to the detection case 11.

Here, the pushing rod connector 23 can be a tightening nut, and the pushing rod connector 23 can tighten the pushing rod 22 on the detection case 11 to achieve a detachable connection between the pushing rod 22 and the detection case 11.

By adopting the above technical proposal, it is easy to replace the pushing rod 22 and the tire abutting plate 21. By changing pushing rods 22 of different lengths and tire abutting plates 21 of different specifications, the adaptability of the tire tread examining device is improved.

In one embodiment, the detection element 31 includes a laser component 311 and a camera component 312. The laser component 311 is used to emit a detection laser to form a detection light strip on the tire tread surface. The camera component 312 is used to capture the detection light strip formed on the tire tread surface.

Here, the emission direction of the laser component 311 is parallel to the lengthwise direction of the detection case 11, so that the detection light strip can be positioned on the tire tread surface in a set direction, and the camera component 312 can capture a suitable detection light strip for analysis.

Further, the detection case 11 is provided with a laser component lens 313 corresponding to the laser component 311 and a camera component lens 314 corresponding to the camera component 312. The laser component lens 313 and the camera component lens 314 are respectively used to adjust the emission direction of the laser and the capture range of the camera component 312.

By adopting the above technical proposal, the detection accuracy of the detection element 31 is improved.

In one embodiment, the detection assembly 3 also includes a control board 32 electrically connected to the laser component 311 and the camera component 312. The control board 32 is located inside the handle case 12. The control board 32 is used to control the laser component 311 and analyze the detection light strip captured by the camera component 312.

Here, the control board 32 is located inside the handle case 12 and is electrically connected to the laser component 311 and the camera component 312 through wires. This can reduce the number of electronic components in the detection case 11 and reduce the volume of the detection case 11, such that the detection case 11 can extend into the gap between the car bumper and the tire more easily.

By adopting the above technical proposal, the volume of the detection case 11 is reduced, making it easier for the detection case 11 to extend into the gap between the car bumper and the tire.

In one embodiment, the detection assembly 3 further includes a display panel 33 and a battery 34 electrically connected to the control board 32. The display panel 33 is disposed on a surface of the handle case 12, and the battery 34 is accommodated inside the handle case 12.

Here, preferably, the display panel 33 is used to display the detection information, and the display panel 33 is arranged on the surface of the handle case 12 away from the detection case 11, so that the inspector can obtain the detection information more easily. In addition, the battery 34 is accommodated inside the handle case 12, which further reduces the volume of the detection case 11, so that the detection case 11 can adapt to smaller gaps in the car.

By adopting the above technical proposal, the applicability of the tire tread examining device is enhanced.

The above are only preferred embodiments of the present application and are not intended to limit the present application. Any modifications, equivalent substitutions and improvements made within the spirit and principles of the present application shall fall within the scope of protection of the present application.

The invention claimed is:

1. A tire tread examining device, comprising:

a case assembly including a detection case and a handle case, the handle case being able to drive the detection case to move, and the detection case and the handle case being spaced apart;

a positioning assembly, including a tire abutting plate located on an end portion of the detection case and perpendicular to a lengthwise direction of the detection case; and a detection assembly, including a detection element located on an end portion of the detection case away from the tire abutting plate.

2. The tire tread examining device as claimed in claim 1, wherein the lengthwise direction of the detection case is parallel to a lengthwise direction of the handle case.

3. The tire tread examining device as claimed in claim 2, wherein the case assembly further includes a rotation shaft connecting the handle case and the detection case, and the rotation shaft is perpendicular to the lengthwise direction of the detection case.

4. The tire tread examining device as claimed in claim 3, wherein the detection element includes a laser component and a camera component, the laser component is configured for emitting a detection laser to form a detection light strip on the tire tread surface, and the camera component is configured for capturing the light strip formed on the tire tread surface.

5. The tire tread examining device as claimed in claim 2, wherein the detection element includes a laser component and a camera component, the laser component is configured for emitting a detection laser to form a detection light strip on the tire tread surface, and the camera component is configured for capturing the light strip formed on the tire tread surface.

6. The tire tread examining device as claimed in claim 1, wherein the tire abutting plate includes at least two abutting portions and a concave portion located between two adjacent abutting portions, the abutting portions have a flat surface for abutting against a tire tread surface, and the concave portion is configured for avoiding uneven parts on the tire tread surface, the concave portion is inwardly recessed toward an interior of the tire abutting plate relative to the abutting portions.

7. The tire tread examining device as claimed in claim 6, wherein the tire abutting plate further includes a magnetic portion, the magnetic portion is disposed on the abutting portions and configured to cooperate with a calibration device before examining.

8. The tire tread examining device as claimed in claim 7, wherein the detection element includes a laser component and a camera component, the laser component is configured for emitting a detection laser to form a detection light strip on the tire tread surface, and the camera component is configured for capturing the light strip formed on the tire tread surface.

9. The tire tread examining device as claimed in claim 6, wherein the detection element includes a laser component and a camera component, the laser component is configured for emitting a detection laser to form a detection light strip on the tire tread surface, and the camera component is configured for capturing the light strip formed on the tire tread surface.

10. The tire tread examining device as claimed in claim 1, wherein the positioning assembly further includes a pushing rod provided on the detection case and extending away from the detection case along the lengthwise direction of the detection case, and the tire abutting plate is arranged on an end of the pushing rod away from the detection case.

11. The tire tread examining device as claimed in claim 10, wherein the positioning assembly further includes a pushing rod connector that detachably connects the pushing rod and the detection case.

12. The tire tread examining device as claimed in claim 11, wherein the detection element includes a laser component and a camera component, the laser component is configured for emitting a detection laser to form a detection light strip on the tire tread surface, and the camera component is configured for capturing the light strip formed on the tire tread surface.

13. The tire tread examining device as claimed in claim 10, wherein the detection element includes a laser component and a camera component, the laser component is configured for emitting a detection laser to form a detection light strip on the tire tread surface, and the camera component is configured for capturing the light strip formed on the tire tread surface.

14. The tire tread examining device as claimed in claim 1, wherein the detection element includes a laser component and a camera component, the laser component is configured for emitting a detection laser to form a detection light strip on the tire tread surface, and the camera component is configured for capturing the light strip formed on the tire tread surface.

15. The tire tread examining device as claimed in claim 14, wherein the detection assembly further includes a control board electrically connected to the laser component and the camera component, the control board is disposed inside the handle case, and the control board is configured for controlling the laser component and analyzing the detection light strip captured by the camera component.

16. The tire tread examining device as claimed in claim 15, wherein the detection assembly further includes a display panel and a battery that are electrically connected to the control board, the display panel is arranged on a surface of the handle case, and the battery is accommodated inside the handle case.

* * * * *